US012358311B2

(12) United States Patent
Eoka

(10) Patent No.: US 12,358,311 B2
(45) Date of Patent: Jul. 15, 2025

(54) PRINTER

(71) Applicant: Toshiba Tec Kabushiki Kaisha, Tokyo (JP)

(72) Inventor: Kenji Eoka, Singapore (SG)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/404,806

(22) Filed: Jan. 4, 2024

(65) Prior Publication Data

US 2024/0140120 A1 May 2, 2024

Related U.S. Application Data

(63) Continuation of application No. 17/550,827, filed on Dec. 14, 2021, now abandoned.

(30) Foreign Application Priority Data

Mar. 5, 2021 (JP) ................................ 2021-035655

(51) Int. Cl.
*B41J 29/02* (2006.01)
*B41J 29/393* (2006.01)

(52) U.S. Cl.
CPC ............ *B41J 29/02* (2013.01); *B41J 29/393* (2013.01)

(58) Field of Classification Search
None
See application file for complete search history.

(56) References Cited

U.S. PATENT DOCUMENTS 6,510,301 B2 * 1/2003 Tanaka ............... H04N 1/00554 399/125
8,419,079 B2 * 4/2013 Cheng ................... G06F 1/1679 292/42
8,514,464 B2 8/2013 Takamura
2014/0092179 A1 4/2014 Tamaki
2016/0140458 A1 5/2016 Gilbert
2017/0210156 A1 7/2017 Klocke et al.

FOREIGN PATENT DOCUMENTS

JP H02-95341 U 7/1990
JP 2005189551 A 7/2005

OTHER PUBLICATIONS

Extended European Search Report dated Jul. 19, 2022, mailed in counterpart European Application No. 22153168.4, 5 pages.

* cited by examiner

*Primary Examiner* — Alejandro Valencia
(74) *Attorney, Agent, or Firm* — Kim & Stewart LLP

(57) ABSTRACT

A printer includes upper and lower modules that are pivotably attached to each other. A first lock portion includes a first fastener on the lower module and a first holding portion on the upper module with a first fastener holding position and a first fastener release position. A second lock portion includes a second fastener on the upper module and a second holding portion on the lower module with a second fastener holding position and a second fastener release position. A link lever is on the upper module and reciprocates back-and-forth. When moved backwards, the link lever moves the first and second holding portions to the respective release positions.

13 Claims, 4 Drawing Sheets

PRINTER

CROSS-REFERENCE TO RELATED APPLICATION

This application is a continuation of U.S. patent application Ser. No. 17/550,827, filed Dec. 14, 2021, which is based upon and claims the benefit of priority from Japanese Patent Application No. 2021-035655, filed Mar. 5, 2021, the entire contents of which are incorporated herein by reference.

FIELD

Embodiments described herein relate generally to a printer.

BACKGROUND

Printers in the related art have a structure permitting the interior of the printer to be accessed by separation of upper and lower parts of the structure from each other. As an example of such a printer structure, an upper module may be overlapping of a lower module and permitting opening of the printer by lifting the front side of the upper module with the back side of the upper module functioning as a fulcrum or hinge. A printer having such a structure generally requires a configuration by which the opening of the printer is prohibited (locked) during printer operations. Such printers may also include a configuration by which an open state can be maintained, such as a latching or propping mechanism.

For maintenance issues such as dealing with paper jams, the opening and closing of the printer may have to be performed, but often some parts they may require access and/or opening are provided on the back side of the printer (front and back in this context refer to a normal operating orientation by which a user's standing position in front of the printer (that is, on the front side of the printer) permits access/operation of a user input panel or the like). Such a printer design thus requires space to be provided around the printer to allow a user to access a rear or side facing access panel or the like.

However, in the case of a printer that has been built into another device such as a kiosk terminal or an ATM (Automatic Teller Machine), since the width of the other device itself is typically designed to be as narrow as possible for various reasons such as reducing the installation area, there is often little to no room left inside the other device to permit access to all parts/sides of the built-in printer. Therefore, an operator/user cannot generally insert a hand or otherwise access rear facing or even side facing portions of the printer.

In the related art, various described printers having a structure in which an upper module can be lifted using a back side portion as a fulcrum or hinge, but such designs fail to enable a user to access side and rear facing portions of the printer without provision of additional space surrounding the printer to permit user access by inserting a hand.

DETAILED DESCRIPTION

Embodiments provide a printer that can be operated to without requiring surrounding access space for inserting a of a hand or the like for access of a side and a back of the printer.

In general, according to one embodiment, a printer has a lower module including a paper feeding unit configured to supply paper and a printing unit configured to print on the paper supplied by the paper feeding unit. An upper module of the printer includes a stacking unit configured to hold the paper that has been printed on by the printing unit. A pivotable support is at a back side portion of the upper module and connects the upper module to the lower module. The upper module is configured to rotate about the pivotable support back and forth between an open state to a closed state. A first lock portion is configured to hold the upper module in the closed state. The first lock portion includes a first fastener on the lower module and a first holding portion on the upper module. The first holding portion is movable between a holding position at which the first fastener is held by the first holding portion and a release position at which the first fastener is released from the first holding portion. A second lock portion is configured to hold the upper module in the open state. The second lock portion includes a second fastener on the upper module and a second holding portion on the lower module. The second holding portion is movable between a holding position at which the second fastener is held by the second holding portion and a release position at which the second fastener is released from the second holding portion. A link lever is provided on the upper module and is configured to reciprocate along a front-to-back direction of the upper module. The link lever, when moved towards a back side of the upper module, causes the first holding portion to move to the release position and the second holding portion to move to the release position.

Certain example embodiments will be described with reference to the drawings.

Figure 1:
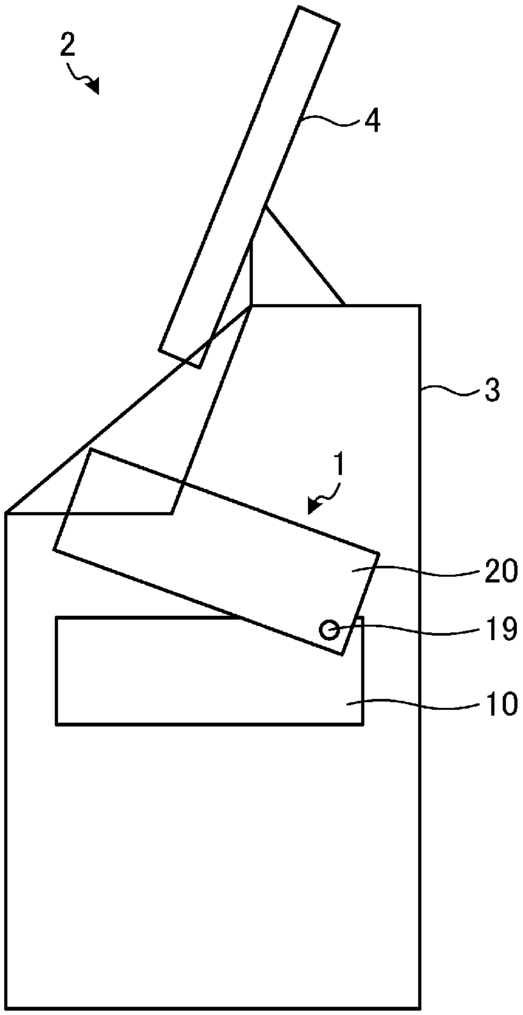
FIG. 1 is a diagram schematically showing a configuration of a kiosk terminal having a built-in printer.

FIG. 1 is a diagram schematically showing a configuration of a kiosk terminal 2 having a built-in printer 1 according to an embodiment. In FIG. 1, the standing position of the operator of the kiosk terminal 2 is on the left side in the drawing. That is, the left side in the drawing corresponds to the front of the kiosk terminal 2, and the kiosk terminal 2 in FIG. 1 is seen from the right side of the kiosk terminal 2.

In the present embodiment, the printer 1 is built in the kiosk terminal 2, but the present disclosure is not limited thereto. In other examples, printer 1 may be built into an ATM or other such devices as well.

The kiosk terminal 2 includes an operation display unit 4 on a box-shaped main body unit 3. The operation display unit 4 receives user input operations according to the displayed content and, in this example, has a touch panel. The display unit 4 includes a display device such as a liquid crystal panel. The printer 1 and other components such as a card reader/writer are in the main body unit 3.

The left side in the drawing is the standing position of the operator (user) of the kiosk terminal 2, the operation display unit 4 displays information toward the standing position of the operator, and the printer 1 dispenses printed matter toward the standing position of the operator. With such a kiosk terminal 2, the surroundings other than the standing position of the operator are not necessarily left open (unfilled), and therefore, in addition to the operation by the operator, maintenance or the like generally needs to be performed from the front side of the kiosk terminal 2 as well.

Figure 2:
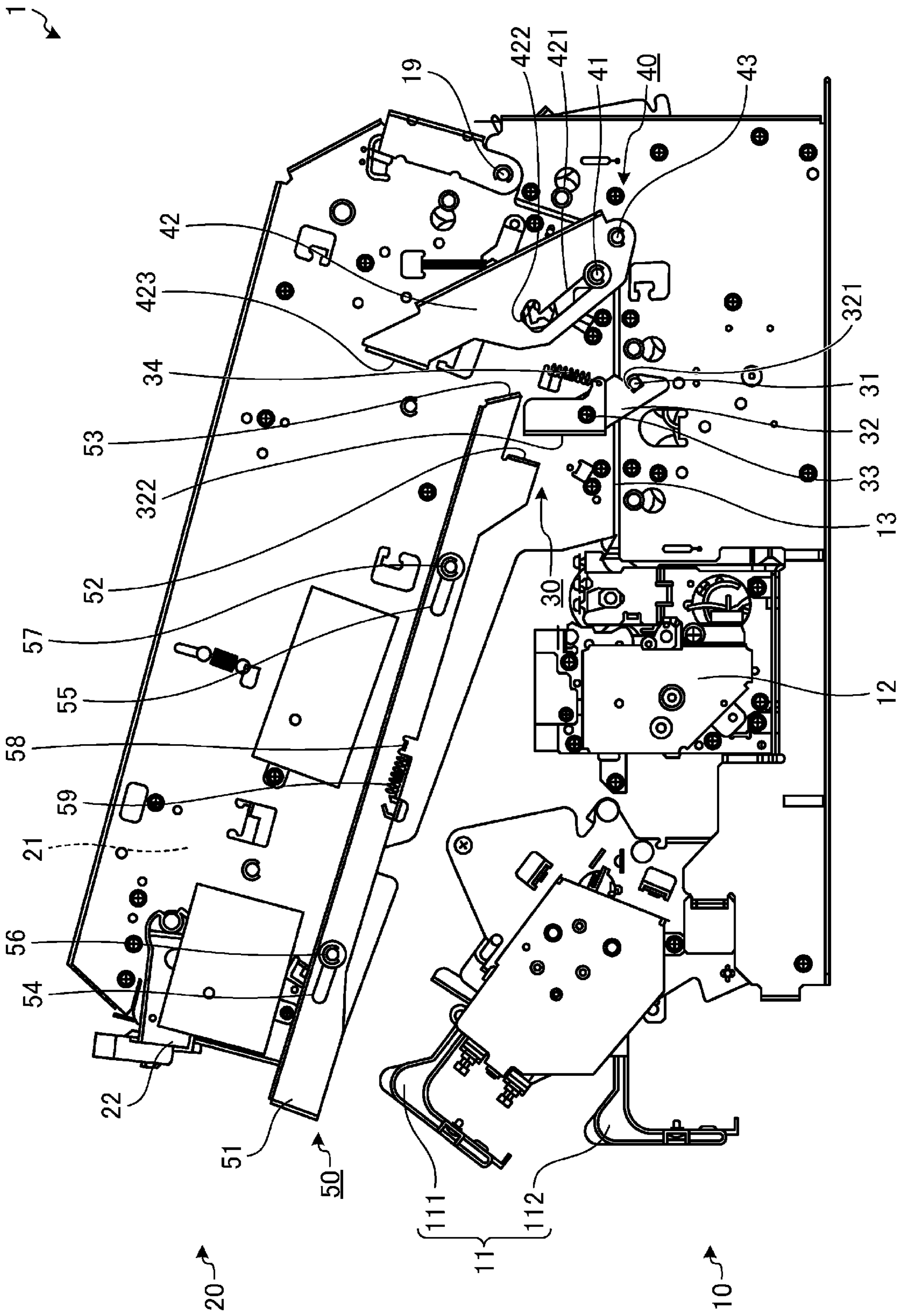
FIG. 2 is a diagram showing an example of a structure of a printer.
Figure 3:
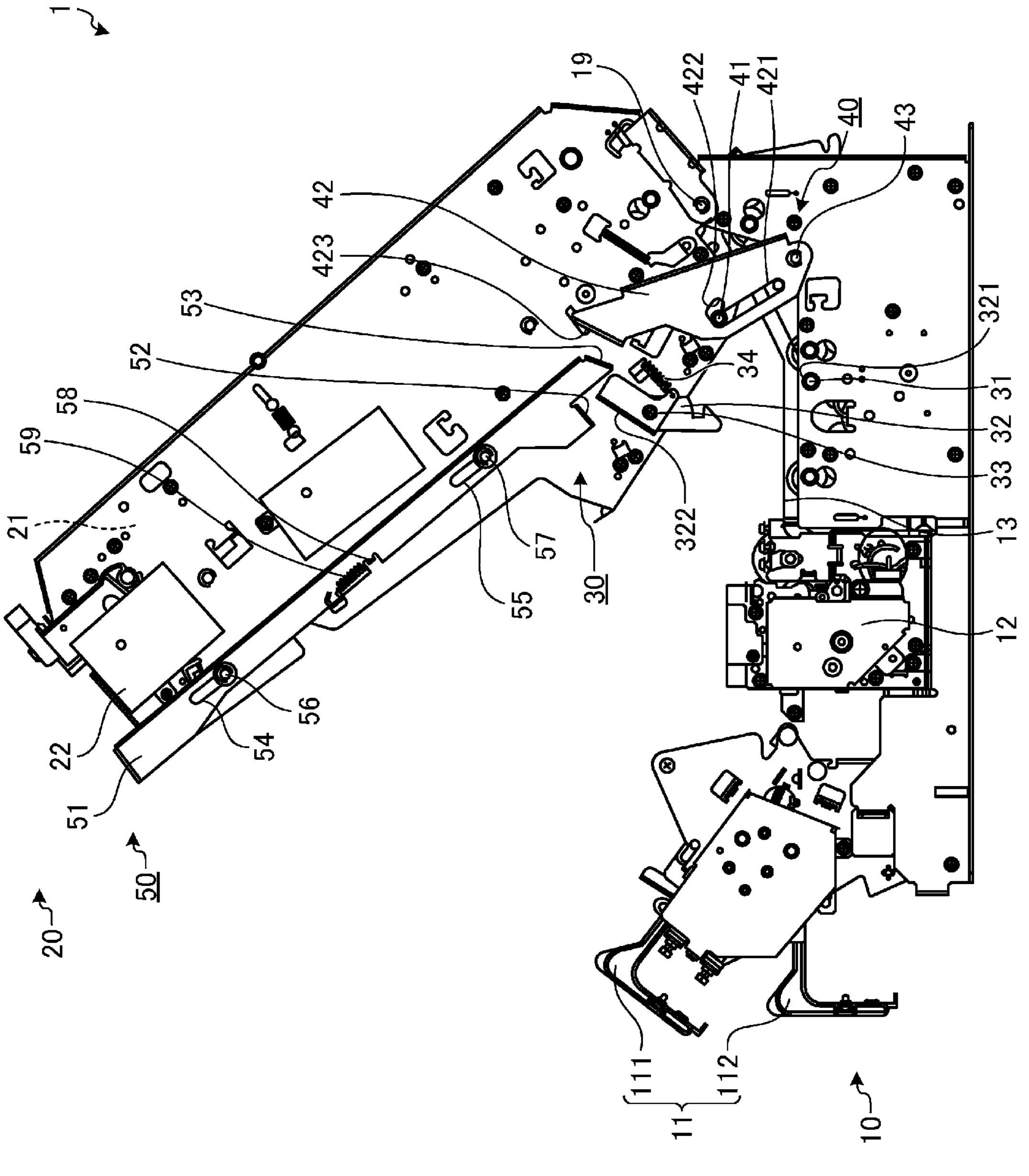
FIG. 3 is a diagram showing an example of a structure of a printer.
Figure 4:
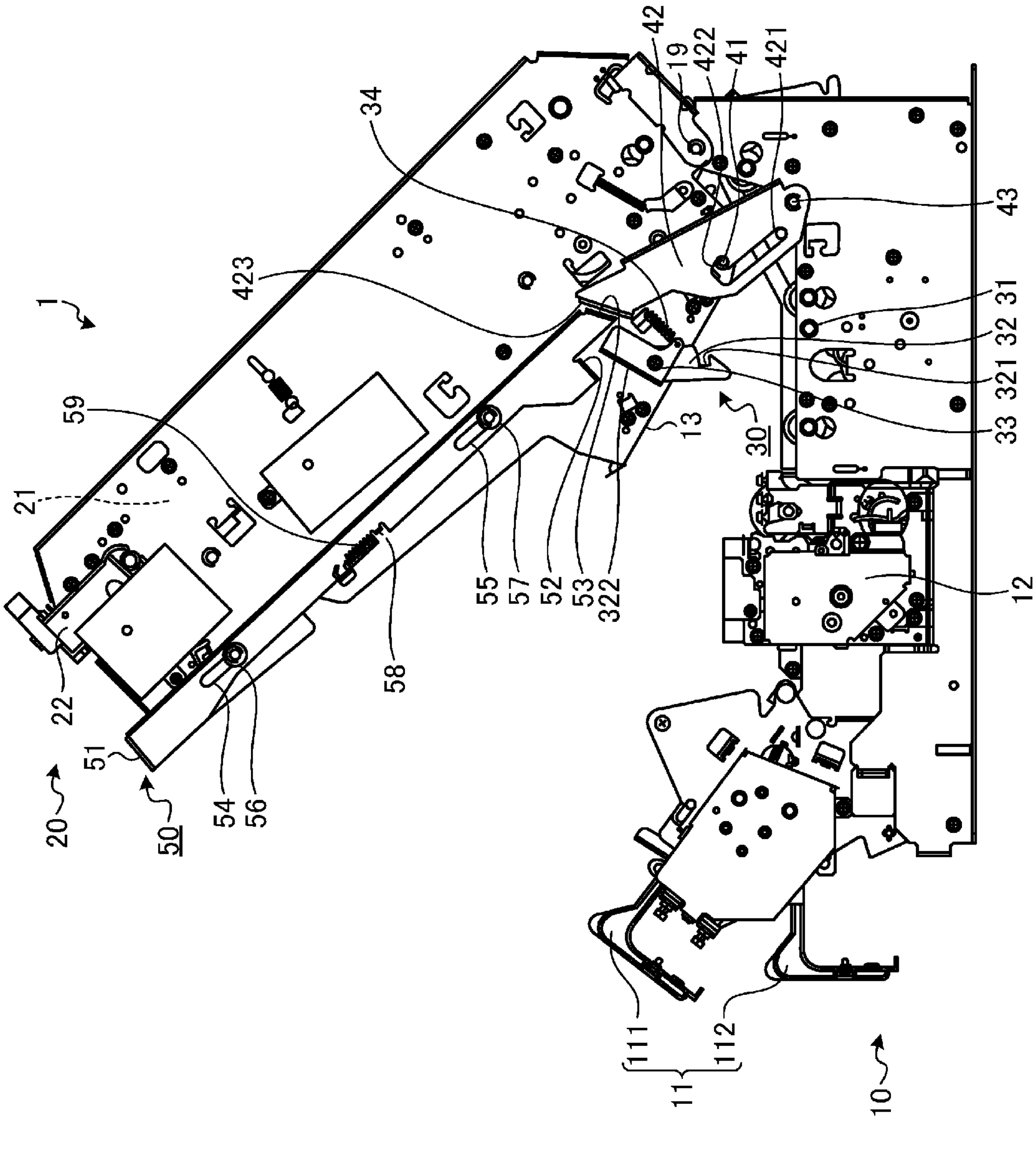
FIG. 4 is a diagram showing an example of a structure of a printer.

The structure of a printer 1 will be described with reference to FIGS. 2 to 4. FIGS. 2 to 4 are diagrams showing an example of the structure of the printer 1. FIG. 2 shows a normal operating state of the printer 1. FIG. 3 shows a state in which the printer 1 has been opened to the maximum extent. FIG. 4 shows aspects by which the printer 1 is maintained open. In general, maintenance and the like are performed in the state shown in FIG. 4. The printer 1 shown in FIGS. 2 to 4 is depicted from the same direction/orientation as that of FIG. 1. In FIGS. 2 to 4, since the left side in the drawing is the front side of the printer 1, the left-right direction in the drawing is the front-rear direction (depth direction) of the printer 1, and the direction into the page of the drawing (direction orthogonal to the paper surface) is the width direction of the printer 1. Further, the vertical (up-down page) direction in the drawing is the height direction of the printer 1.

The printer 1 includes a lower module 10 and an upper module 20. The lower module 10 has a paper feeding unit 11, a printing unit 12, and a conveying unit 13. The upper module 20 has a stacking unit 21 and a paper discharge port 22.

The printer 1 includes a shaft 19 at the back side of the upper module 20 and the lower module 10. The shaft 19 pivotably attaches the upper module 20 to the lower module 10 and thus functions as hinge point. As a result, the upper module 20 is pivotably supported by the lower module 10 at the back side of printer 1, and can be brought into contact with and separated from the lower module 10 by pivoting about the shaft 19. A biasing member or the like for biasing the upper module 20 in the lifting (opening) direction can be provided in the vicinity of the shaft 19. The biasing member is, for example, a torsion spring provided on the shaft 19 or otherwise.

The paper feeding unit 11 includes two paper feed paths 111 and 112 and supplies the sheets taken in from the respective paper feed paths 111 and 112 to the printing unit 12. For example, the paper feeding unit 11 first supplies paper to the printing unit 12 by the first paper feed path 111, and if the paper runs out, the paper in the paper feed path 111 is back-fed and retracted from the printing unit 12, and then restarts paper supply with the second paper feed path 112. The sheet is, for example, fanfold paper (fan-folded paper or stock). The folded portion of the fanfold paper before being pulled out is stored in the lower part of the main body unit 3 shown in FIG. 1.

The printing unit 12 includes a printing head and a platen, and prints on a sheet sandwiched between the printing head and the platen. A cutter for cutting the printed sheet to a predetermined length is provided in the subsequent stage after the printing unit 12. The conveying unit 13 provides a substantially U-shaped conveyance path from the lower module 10 to the upper module 20 and conveys the printed and cut sheets to the stacking unit 21.

The stacking unit 21 stacks and aligns a plurality of sheets that have been printed and cut to a predetermined length to form a bundle of paper. The paper discharge port 22 discharges a bundle of paper aligned with the stacking unit 21.

The printer 1 further includes a first lock portion 30, a second lock portion 40, and a link lever 50.

The first lock portion 30 holds the upper module 20 at a position close to the lower module 10 and prevents the upper module 20 from pivoting (opening). When the first lock portion 30 is released, the upper module 20 can move in a direction away from the lower module 10 due to the biasing force of the biasing member provided in the vicinity of the shaft 19 or the like. The biasing member only needs to provide a small biasing force capable of preventing an unintended relocking of the first locking portion 30 due to the upper module 20 being lowered by its own weight. For example, it is not necessary to provide enough biasing force to flip up the upper module 20 to the state shown in FIG. 3, and it is generally preferable that the upper module 20 be lifted to only to extent necessary to permit the operator to readily recognize that the unlocking of the first locking portion 30 has occurred.

The first lock portion 30 includes a stud 31 (as one example of a first fastener), a hook 32 (as one example of a first holding portion), a shaft 33, and a biasing member 34. The biasing member 34 is, for example, a string-wound spring. The stud 31 is provided on the lower module 10. The shaft 33 and the hook 32 are provided on the upper module 20.

The hook 32 is pivotably supported by the shaft 33 along the width direction of the printer 1. The hook 32 is movable to a holding position for holding (fastening) the stud 31 (see FIG. 2) and a releasing position where the stud 31 is released as the hook 32 pivots.

The biasing member 34 biases the hook 32 in the direction from the release position toward the holding position. If there is no external force against the biasing of the biasing member 34 for positioning the hook 32 in the release position, the hook 32 automatically returns to the holding position.

The hook 32 includes a groove 321 and a pressable portion 322. The groove 321 has a width that allows the stud 31 to enter and exit, and when the upper module 20 is at a position close to the lower module 10 (also referred to as a closed position), the stud 31 is hooked and held.

The pressable portion 322 receives a pressing force from the link lever 50, and is located on the opposite side of the groove 321 with the shaft 33 interposed therebetween. When the pressable portion 322 is pressed, the hook 32 pivots in the direction by which the stud 31 comes out from the groove 321.

The hook 32 has a guide slope at its tip that guides the stud 31 to the groove 321. The guide slope is provided to encourage the hook 32 to pivot by sliding with the stud 31 when the upper module 20 descends from a position away from the lower module 10 (also referred to as an open position) to a position closer to the lower module 10.

The second lock portion 40 holds the upper module 20 at a position away from the lower module 10 so as prevent pivoting. The second lock portion 40 includes a stud 41 (as one example of a second fastener), a hook 42 (as one example of a second holding portion), and a shaft 43. The stud 41 is provided on the upper module 20. The shaft 43 and the hook 42 are provided on the lower module 10.

The hook 42 is pivotably supported by the shaft 43 along the width direction of the printer 1. The hook 42 is movable to a holding position for holding the stud 41 (see FIG. 4) and a releasing position where the stud 41 is released as the hook 42 pivots.

The hook 42 includes grooves 421 and 422 and a pressable portion 423. The groove 421 has a shape approximating an arc centered on the shaft 19. The groove 422 has a shape approximating an arc centered on the shaft 43. Further, the groove 422 is continuous with the end (final end) of the groove 421 farther from the shaft 43.

The grooves 421 and 422 have a width permitting the stud 41 to be slidably moved. The stud 41 moves inside the groove 421 and toward the groove 422 as the upper module 20 moves away from the lower module 10. The state in which the stud 41 reaches the final end of the groove 421 (see FIG. 3) is the state at which the upper module 20 is opened to the maximum extent. From this state, if the force on lifting the upper module 20 is removed, the upper module 20 will be lowered by its own weight, whereby the stud 41 moves from the final end of the groove 421 into the groove 422. The groove 422 hooks and holds the stud 41 when the upper module 20 is located at a position away from the lower module 10.

The pressable portion 423 receives a pressing force from the link lever 50, and is provided at a position further away from the position where the grooves 421 and 422 are provided from the shaft 43. When the pressable portion 423 is pressed, the hook 42 pivots in the direction towards which the stud 41 moves from the groove 422 to the groove 421.

The link lever 50 has its longitudinal direction facing the depth direction of the upper module 20, includes a handle 51 protruding toward the front side of the upper module 20, and has two pressing portions 52 and 53 on the back side.

The link lever 50 includes two elongated holes 54 and 55 and two studs 56 and 57. The elongated holes 54 and 55 are apart from each other in the longitudinal direction of the link lever 50, and the longitudinal directions of the elongated holes 54 and 55 are aligned along the longitudinal direction of the link lever 50. The studs 56 and 57 are attached to the upper module 20 separated from each other in the front-rear direction and are fitted into the elongated holes 54 and 55, respectively. The studs 56 and 57 can slide within the respective elongated holes 54 and 55. As a result, the link lever 50 is slidable in the front-rear direction of the upper module 20. The link lever 50 is biased toward the front side of the upper module 20 by the biasing member 59 connecting a notch 58 and the upper module 20.

The pressing portion 52 is provided at a position facing the pressable portion 322 when the upper module 20 is closed. The pressing portion 53 is provided at a position facing the pressable portion 423 when the upper module 20 opened away from the lower module 10.

The link lever 50 is provided on the upper module 20 and can reciprocate (shift) between the front side and the back side, and act on the hook 32 or the hook 42 depending on the position of the upper module 20 when moving to the back side. That is, the link lever 50 moves the hook 32 to the release position if the upper module 20 is at a position close to the lower module 10, and moves the hook 42 to the release position if the upper module 20 is at a position away from the lower module 10.

More specifically, if the handle 51 is pushed in when the upper module 20 is closed, the pressable portion 322 is pressed by the pressing portion 52 that moves toward the back side of the upper module 20. As a result, the hook 32 pivots, the stud 31 comes out of the groove 321, the holding of the stud 31 is released, and the upoer module 20 is lifted by the biasing of a biasing member in the vicinity of the shaft 19.

When the handle 51 is pushed in when the upper module 20 is at a position away from the lower module 10, the pressable portion 423 is pressed by the pressing portion 53 that moves toward the back side of the upper module 20. As a result, the hook 42 pivots, the stud 41 moves from the groove 422 to the groove 421, the holding of the stud 41 is released, and the upper module 20 can be lowered.

In the printer 1 having such a configuration, when opening the printer 1 for maintenance or the like, the operator first holds the handle 51 of the link lever 50 and pushes the link lever 50 in the direction from the front to the back. As a result, the pressing portion 52 of the link lever 50 presses the pressable portion 322 of the hook 32. Then, the hook 32 pivots (in the clockwise direction in FIG. 2). As a result, the groove 321 moves, and the holding of the stud 31 is released. Then, the upper module 20 pivots around the shaft 19 and is lifted by the biasing of the biasing member. As a result, the operator can recognize that the lock by the first lock portion 30 has been released.

The operator who recognizes that the lock by the first lock portion 30 has been released can then lift the upper module 20. As a result, the upper module 20 further pivots around the shaft 19. According to this pivoting, the stud 41 moves within the groove 421 and becomes the state shown in FIG. 3. In the state shown in FIG. 3, since the stud 41 is located at the uppermost portion (final end) of the groove 421, the upper module 20 cannot pivot any more. By this, the operator can recognize that the upper module 20 is in a fully opened state.

The operator recognizing that the upper module 20 is in the fully opened state releases the upper module 20 and stops lifting. Upon the operator ending the lifting of the upper module 20, the upper module 20 will be slightly lowered (by its own weight), and at this time, the stud 41 moves from the final end of the groove 421 to the groove 422. When the stud 41 reaches the end (final end) of the groove 422, the upper module 20 is kept open by the second lock portion 40.

Next, a case where the operator who completes maintenance or the like returns the upper module 20 to a closed position will be described. First, the operator holds the handle 51 of the link lever 50 and pushes the link lever 50 in the direction from the front to the back while also supporting the upper module 20. As a result, the pressing portion 53 of the link lever 50 presses the pressable portion 423 of the hook 42. Then, the hook 42 pivots in the clockwise direction in FIG. 4. As a result, the groove 422 moves, and the holding of the stud 41 is released (state shown in FIG. 3). The upper module 20 will now tend to pivot around the shaft 19 and lower due to its own weight. As a result, the operator can recognize that the lock by the second lock unit 40 has been released.

The operator recognizing that the lock by the second lock portion 40 has been released now reduces the applied force for supporting the upper module 20. As a result, the upper module 20 is lowered toward the closed position while pivoting around the shaft 19. The stud 41 moves within the groove 421 according to the extent of pivoting. If the upper module 20 is completely lowered by its own weight, the biasing member provided in the vicinity of the shaft 19 will still bias the upper module 20 in the opening direction, and the upper module 20 will not reach the completely (fully) closed position. The operator must push down the upper module 20 against the opening biasing. As a result of this pushing, the guide slope at the tip of the hook 32 of the first lock portion 30 slides on the stud 31 and the hook 32 pivots against the biasing of the biasing member 34. When the guide slope passes the stud 31, the stud 31 fits into the groove 321 and the stud 31 is held. As a result, the upper module 20 reaches the completely closed position, and the printer 1 is now in an operable state.

As described above, according to the printer 1 of the present embodiment, the first lock portion 30 and the second lock portion 40 provided on the back side of the printer 1 can be operated by operating the link lever 50. Therefore, according to the present embodiment, it is possible to enable opening and closing of the upper module 20 with respect to the lower module 10 without an operator inserting a hand from the side portion of the printer 1 to the back side.

Furthermore, in the present embodiment, the second lock portion 40 is provided in the vicinity of the shaft 19 which is a fulcrum that pivotably supports the upper module 20 on the lower module 10. Therefore, the vertical dimension of the second lock portion 40 can be kept small. If the second lock portion is provided on the front side (a position away from the shaft 19) of the printer 1, the larger the opening degree of the printer 1 at the time of maintenance, and the larger the size of the second lock portion. If the size of the second lock portion is large, it may not be possible to easily accommodate the second lock portion within the printer 1 when the printer 1 is closed, which is not preferable. In that respect, according to the present embodiment, the second lock portion 40 can be made more compact than otherwise would be case.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer, comprising:

a lower module including a paper feeding unit by which paper is supplied and a printing head configured to print on the supplied paper;

an upper module including a stacking unit on which the printed paper can be held;

a pivotable support at a back side portion of the upper module and connecting the upper and lower modules such that the upper module is rotatable about the pivotable support between an open state and a closed state;

a first lock portion by which the upper module can be held in the closed state and including a first fastener on the lower module and a first hook on the upper module, the first hook being movable between a first holding position at which the first fastener is held by the first hook and a first release position at which the first fastener is released from the first hook;

a second lock portion by which the upper module can be held in the open state and including a second fastener on the upper module and a second hook on the lower module, the second hook being movable between a second holding position at which the second fastener is held by the second hook and a second release position at which the second fastener is released from the second hook; and a link lever extending along a side surface of the upper module, a front end of the link lever protruding from a front surface of the upper module, a back end of the link lever having first and second surfaces that are separate from each other, wherein when the first hook is at the first holding position and the link lever is moved towards a back side of the upper module, the first surface of the link lever presses a part of the first hook to move from the first holding position to the first release position to thereby enable the second hook to move from the second release position to the second holding position, and when the second hook is at the second holding position and the link lever is moved towards the back side of the upper module, the second surface of the link lever presses a part of the second hook to move from the second holding position to the second release position to thereby enable the first hook to move from the first release position to the first holding position.

2. The printer according to claim 1, wherein the link lever is attached to the upper module so as to reciprocate along a front-to-back direction of the upper module.

3. The printer according to claim 1, wherein the link lever protrudes from the front surface of the upper module when viewed from above.

4. The printer according to claim 1, wherein the second lock portion is adjacent to the pivotable support.

5. The printer according to claim 1, wherein the second lock portion is nearer a back side of the lower module than to a front side of the lower module.

6. The printer according to claim 1, wherein the pivotable support includes a shaft connected to both the upper and lower modules.

7. The printer according to claim 1, wherein the second hook is pivotably attached to the lower module, the second hook is movable between the second holding position and the second release position when pivoted, and the second hook includes a pressable portion facing the back end of the link lever.

8. The printer according to claim 7, wherein the pressable portion is closer to a front side of the lower module than an axis around which the second hook pivots.

9. The printer according to claim 7, wherein, when the second hook is at the second holding position and the link lever is moved towards the back side of the upper module, the second surface of the link lever presses the pressable portion of the second hook to pivot the second hook.

10. The printer according to claim 1, wherein the first hook is pivotably attached to the upper module, the first hook is movable between the first holding position and the first release position when pivoted, and the first hook includes a pressable portion facing the back end of the link lever.

11. The printer according to claim 10, wherein the pressable portion is closer to the front surface of the upper module than an axis around which the first hook pivots.

12. The printer according to claim 10, wherein when the first hook is at the first holding position and the link lever is moved towards the back side of the upper module, the first surface of the link lever presses the pressable portion of the first hook to pivot the first hook.

13. The printer according to claim 1, wherein the second hook is pivotably attached to the lower module at a pivoting fulcrum, the second hook has a first groove for the second fastener and a second groove that connects with the first groove and holds the second fastener, the first groove has a shape corresponding to an arc centered on the pivotable support of the upper module, and the second groove has a shape corresponding to an arc centered on the pivoting fulcrum of the second hook.

* * * * *